(12) United States Patent
Hestetun et al.

(10) Patent No.: US 10,240,438 B2
(45) Date of Patent: Mar. 26, 2019

(54) SUBSEA HORIZONTAL CONNECTION ARRANGEMENT

(71) Applicant: Vetco Gray Scandinavia AS, Sandvika (NO)

(72) Inventors: Steinar Lindemann Hestetun, Sandvika (NO); Staale Svindland, Sandvika (NO)

(73) Assignee: Vetco Gray Scandinavia AS, Sandvika (NO)

( * ) Notice: Subject to any disclaimer, the term of this patent is extended or adjusted under 35 U.S.C. 154(b) by 0 days.

(21) Appl. No.: 15/570,532

(22) PCT Filed: Apr. 28, 2016

(86) PCT No.: PCT/EP2016/059551
§ 371 (c)(1),
(2) Date: Oct. 30, 2017

(87) PCT Pub. No.: WO2016/174166
PCT Pub. Date: Nov. 3, 2016

(65) Prior Publication Data
US 2018/0142538 A1 May 24, 2018

(30) Foreign Application Priority Data
Apr. 30, 2015 (NO) .................................. 20150518

(51) Int. Cl.
*E21B 43/013* (2006.01)
*F16L 1/26* (2006.01)
*F16L 23/04* (2006.01)

(52) U.S. Cl.
CPC .............. *E21B 43/013* (2013.01); *F16L 1/26* (2013.01); *F16L 23/04* (2013.01)

(58) Field of Classification Search
CPC .. E21B 41/0007; E21B 33/038; E21B 43/017; F16L 11/26; F16L 23/04
(Continued)

(56) References Cited

U.S. PATENT DOCUMENTS 4,191,256 A * 3/1980 Croy ..................... E21B 33/037
141/387
4,426,104 A * 1/1984 Hazelrigg ............. E21B 43/013
285/26

(Continued)

OTHER PUBLICATIONS

First Office Action and Search Report issued in connection with corresponding NO Application No. 20150518 dated Jan. 7, 2016.
(Continued)

*Primary Examiner* — James G Sayre
(74) *Attorney, Agent, or Firm* — GE Global Patent Operation; Marc A. Vivenzio

(57) ABSTRACT

A horizontal connection arrangement for subsea connection of a first hub arranged on a first subsea module to a second hub arranged on a second subsea module. The first hub is fixed to a first holding unit and the second hub is fixed to a second holding unit. A sliding unit is slidably mounted to the first holding unit so as to be horizontally moveable in relation to the first holding unit. A connector for connecting and securing the first hub to the second hub is mounted to the sliding unit and horizontally moveable together with the sliding unit between a retracted position, in which an outer end of the first hub projects beyond a front side of the connector, and an advanced position, in which the outer end of the first hub is received inside the connector.

10 Claims, 7 Drawing Sheets

(58) Field of Classification Search
USPC ....... 166/338, 339, 341, 343, 344, 347, 348, 166/349
See application file for complete search history.

(56) References Cited

U.S. PATENT DOCUMENTS

| | | |
|---|---|---|
| 4,625,805 A | 12/1986 | Ladecky |
| 5,025,865 A | 6/1991 | Caldwell et al. |
| 2010/0021238 A1 | 1/2010 | Mogedal et al. |
| 2012/0133122 A1* | 5/2012 | Hovik .................... B63B 27/24 285/27 |
| 2012/0201607 A1 | 8/2012 | Larsson et al. |
| 2013/0206420 A1 | 8/2013 | McHugh et al. |
| 2014/0103636 A1 | 4/2014 | Hestetun |

OTHER PUBLICATIONS

International Search Report and Written Opinion issued in connection with corresponding PCT Application No. PCT/EP2016/059551 dated Jul. 26, 2016.
International Preliminary Report on Patentability issued in connection with corresponding PCT Application No. PCT/EP2016/059551 dated Oct. 31, 2017.

* cited by examiner

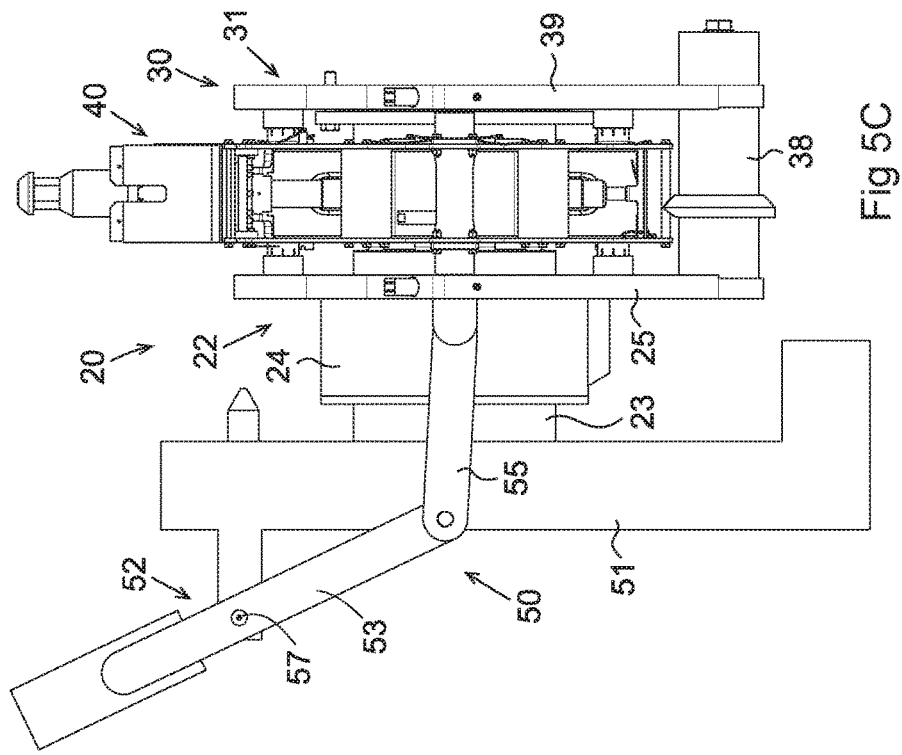
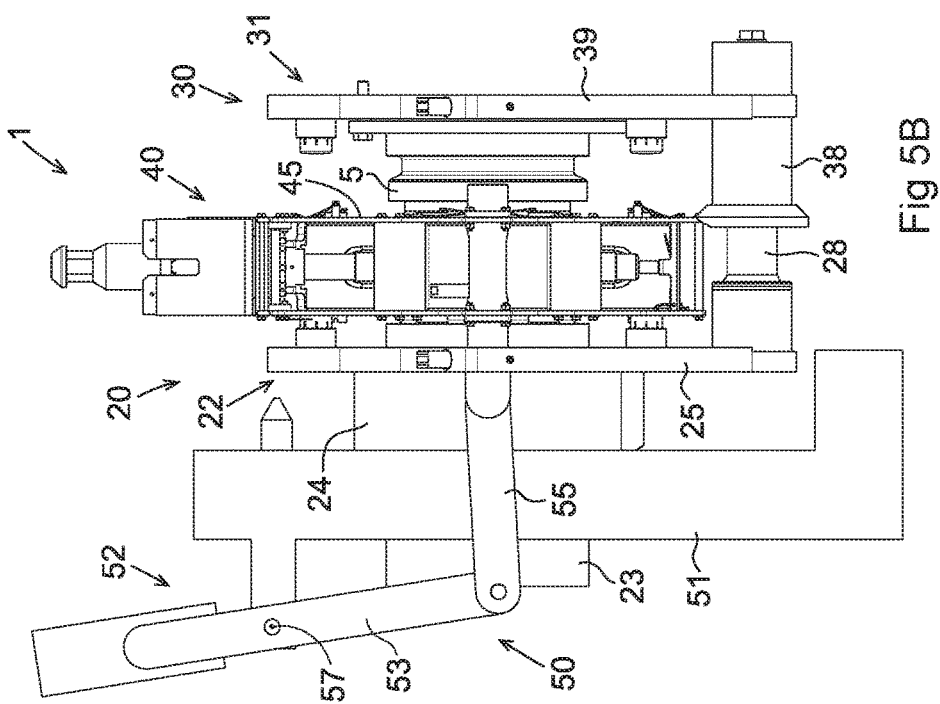

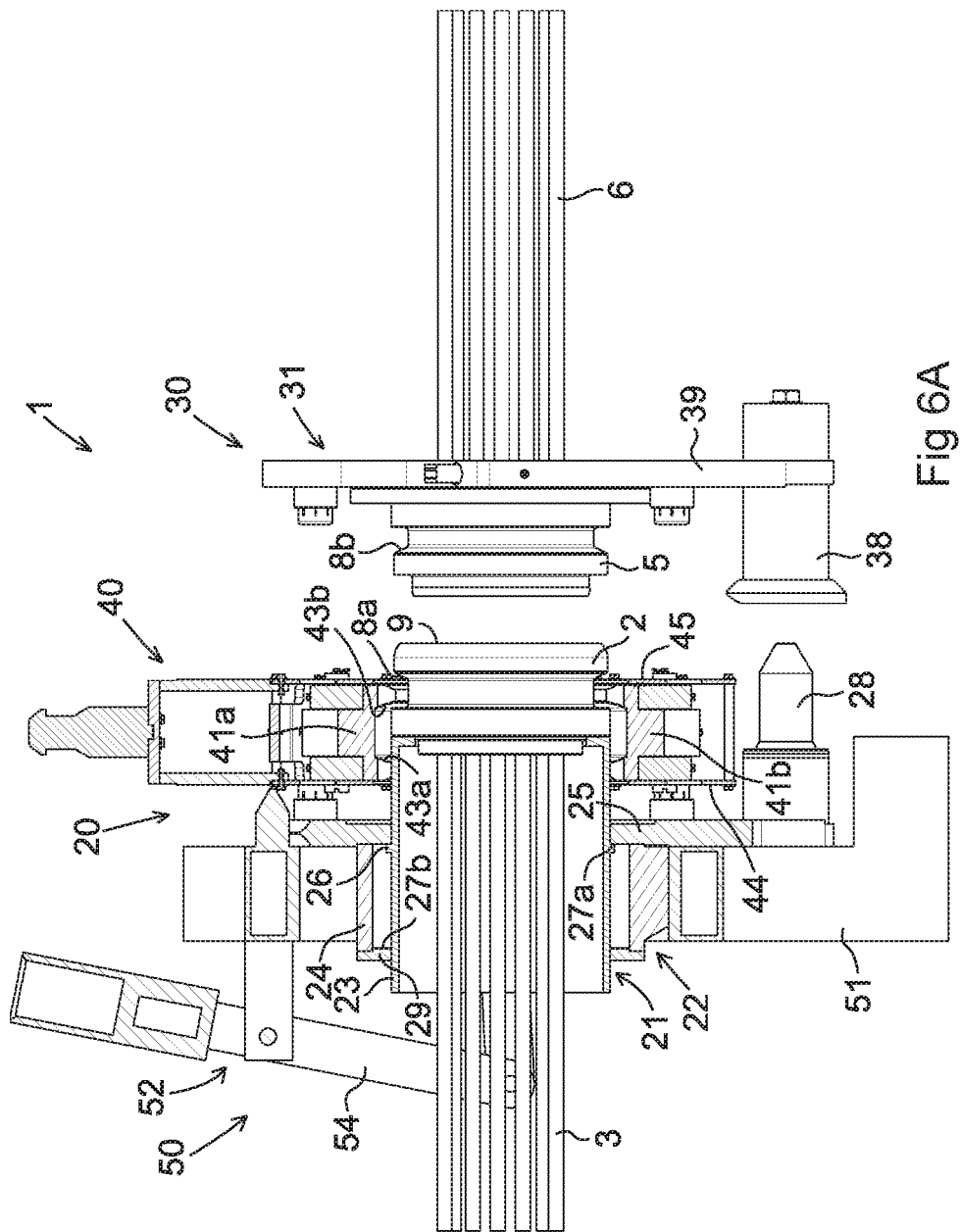

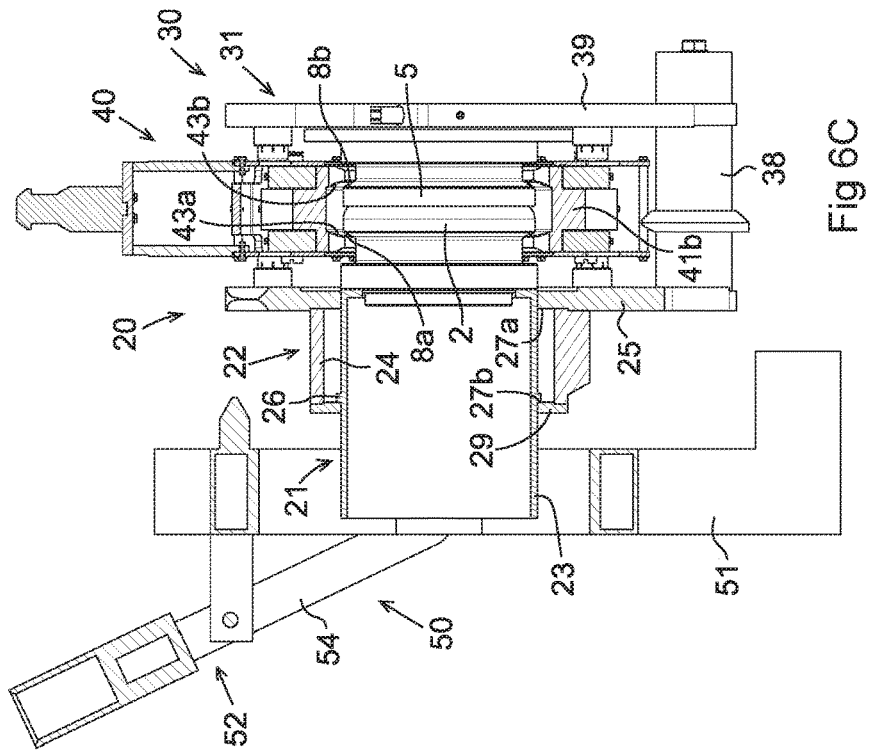
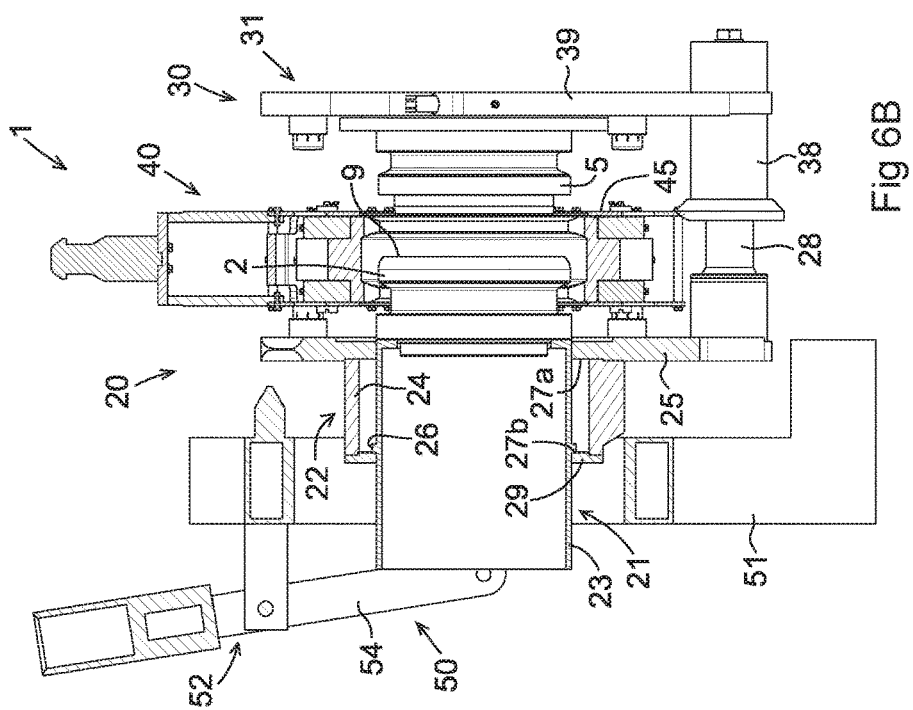

SUBSEA HORIZONTAL CONNECTION ARRANGEMENT

BACKGROUND OF THE INVENTION

Embodiments of the present invention relate to a horizontal connection arrangement according to the preamble of claim 1 for subsea connection of a first single bore or multibore hub arranged on a first subsea module of a subsea oil and/or gas production system or subsea water and/or gas injection system to a second single bore or multibore hub arranged on a second subsea module of said system.

Different components of a subsea oil and/or gas production system, i.e. a subsea system for processing and transport of oil and/or gas, may have a modular construction and comprise interchangeable modules mounted to a seabed-based foundation structure. The respective module may be adapted to be mounted to the foundation structure by being lowered vertically downwards into engagement with the foundation structure and demounted from the foundation structure by being lifted vertically upwards away from the foundation structure. Hereby, it will be possible to easily adapt the system as needed to the prevailing processing conditions by adding or removing individual modules, and it will also be possible to disconnect an individual module and retrieve it to the surface for repair or replacement of components. Modularized subsea oil production systems with this type of modules are for instance disclosed in U.S. Pat. Nos. 4,625,805 A and 5,025,865 A.

In a modularized subsea system of the above-mentioned type, there is sometimes a need to connect fluid conduits of two adjacent modules to each other in a horizontal direction. Said fluid conduits may for instance comprise hydraulic lines and/or gas lines. Several fluid conduits of a first module which are to be connected to corresponding fluid conduits of a second module may end in a first multibore hub arranged on the first module, wherein the corresponding fluid conduits of the second module end in a corresponding multibore hub arranged on the second module. The hubs are to be so located on the respective module that they will be positioned in front of and in alignment with each other when the two modules have assumed their final position in relation to each other. One of the hubs may then be moved horizontally forwards by means of an actuating device into engagement with the other hub, whereupon the hubs are secured to each other by means of a connector, for instance in the form of a clamp connector or collet connector. The connector is for instance fixed to the first module before this module is lowered into the sea for installation, wherein the connector surrounds an outer end of the hub of the first module and is configured to receive an outer end of the hub of the second module when the hubs are brought into contact with each other. When one of the modules is landed onto a landing platform or interface of a seabed-based foundation structure of the subsea system during installation of the module next to the other module, a certain running clearance, i.e. a certain interspace, has to be maintained between the connector of the first module and the hub of the second module in order to prevent the connector from bumping into this hub. When the module has been landed onto the landing platform/interface, an actuating device has to perform a horizontal stroke in order to move one of the hubs into contact with the other hub. During the final part of this stroke, the outer end of the hub of the second module is received inside the connector. Thus, the total stroke length required for moving one of the hubs into contact with the other hub will in this case correspond to the running clearance plus the axial length of the part of the hub of the second module received inside the connector.

SUMMARY OF THE INVENTION

An object of an embodiment of the present invention is to provide a horizontal connection arrangement of the above-mentioned type with a new and favourable design.

According to embodiments of the invention, this object is achieved by a horizontal connection arrangement having the features defined in claim 1.

The horizontal connection arrangement of embodiments of the present invention comprises:

a first connection appliance mounted to a first subsea module of a subsea oil and/or gas production system or subsea water and/or gas injection system, wherein a first single bore or multibore hub is fixed to a first holding unit included in the first connection appliance and wherein the first connection appliance comprises a sliding unit which is slidably mounted to the first holding unit so as to be horizontally moveable in relation to the first holding unit and the first hub in the axial direction of the first hub; a second connection appliance mounted to a second subsea module of said system, wherein a second single bore or multibore hub is fixed to a second holding unit included in the second connection appliance; and a connector for connecting and securing the first hub to the second hub, wherein the connector is mounted to said sliding unit so as to be horizontally moveable together with the sliding unit in relation to the first holding unit and the first hub between a retracted position, in which an outer end of the first hub projects beyond a front side of the connector, and an advanced position, in which the outer end of the first hub is received inside the connector.

The connector is intended to be in the retracted position during installation of one of the modules next to the other module and during retrieval of one of the modules, which implies that the above-mentioned running clearance during installation and retrieval of a module will be the distance between the outer end of the first hub and the outer end of the second hub. When the modules, during installation, has been correctly positioned in relation to each other with the first hub in front of and in alignment with the second hub, the connector may be moved together with the sliding unit from the retracted position to the advanced position and a horizontal stroke may then be performed in order to move one of the hubs into contact with the other hub. Thus, the total stroke length required for moving one of the hubs into contact with the other hub will in this case correspond to the running clearance, which implies that the required stroke length is shorter with the horizontal connection arrangement of embodiments of the present invention as compared to the previously known horizontal connection arrangement described above. The reduced stroke length implies a reduced need of flexibility for the fluid conduits which are fixed to the horizontally moveable hub, which in its turn implies that the fluid conduits will have reduced tendency to vibrate.

Further advantages as well as advantageous features of the horizontal connection arrangement according to embodiments of the present invention will appear from the dependent claims and the following description.

BRIEF DESCRIPTION OF THE DRAWINGS

With reference to the appended drawings, a specific description of embodiments of the invention cited as examples follows below.

In the drawings:

FIGS. 6A, 6B and 6C are partially cut lateral views of the first and second connection appliances of FIG. 3, as seen at the different stages illustrated in FIGS. 5A, 5B and 5C.

DETAILED DESCRIPTION OF THE INVENTION

Figure 1:
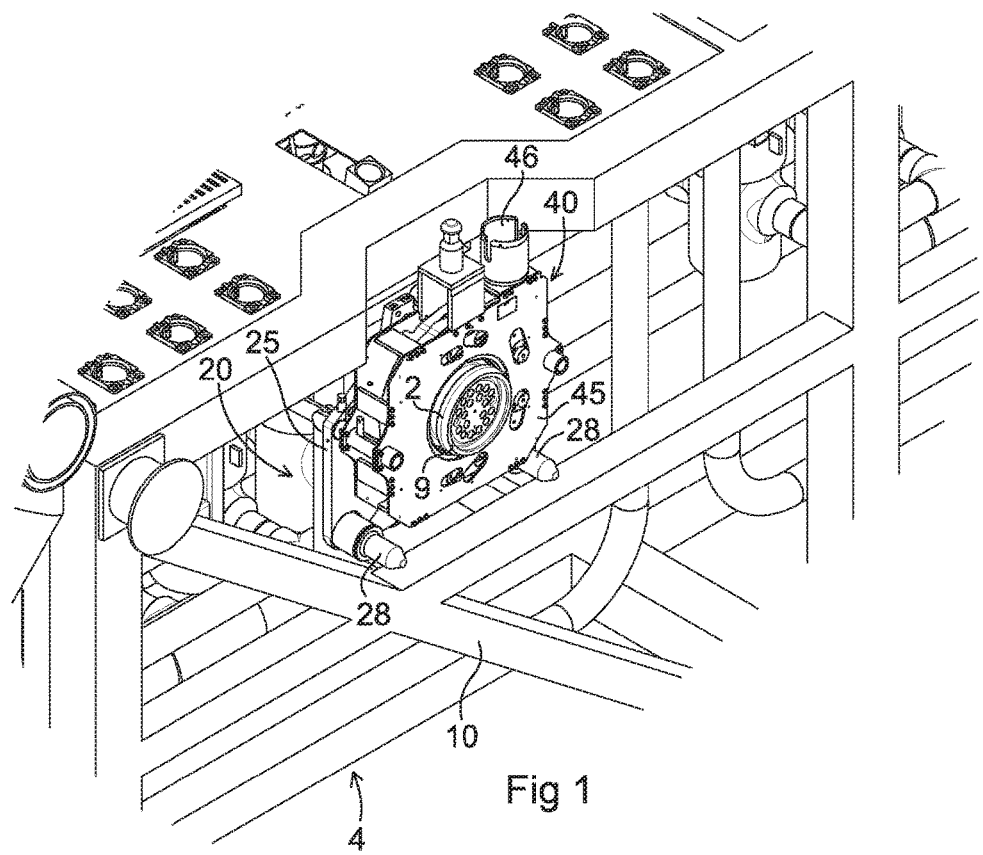
FIG. 1 is a perspective view of a part of a first subsea module provided with a first connection appliance included in a horizontal connection arrangement.
Figure 2:
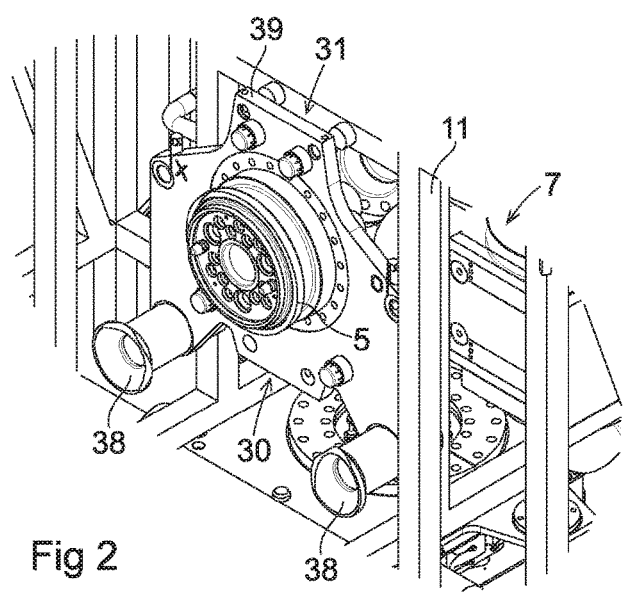
FIG. 2 is a perspective view of a part of a second subsea module provided with a second connection appliance included in a horizontal connection arrangement.
Figure 3:
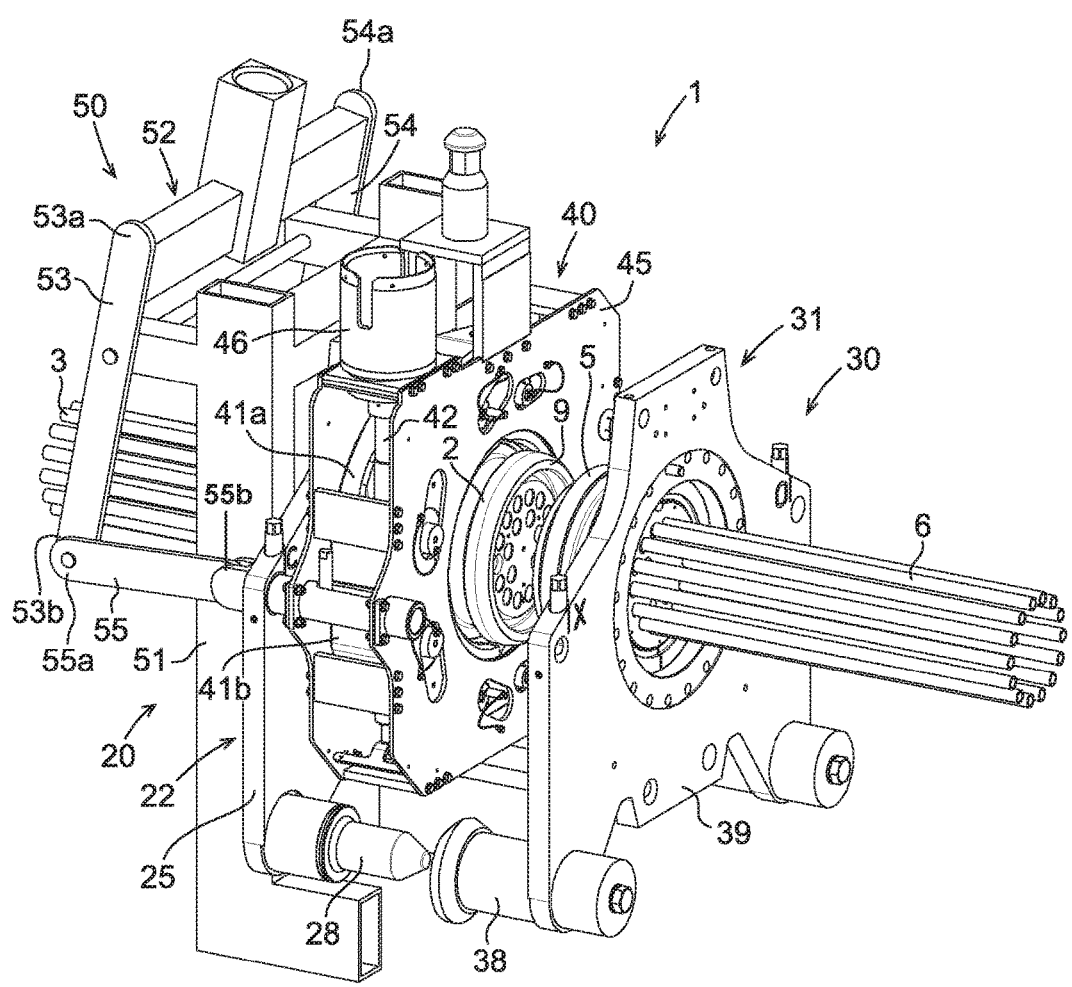
FIG. 3 is a perspective view from a first side of the first connection appliance of FIG. 1 and the second connection appliance of FIG. 2.
Figure 4:
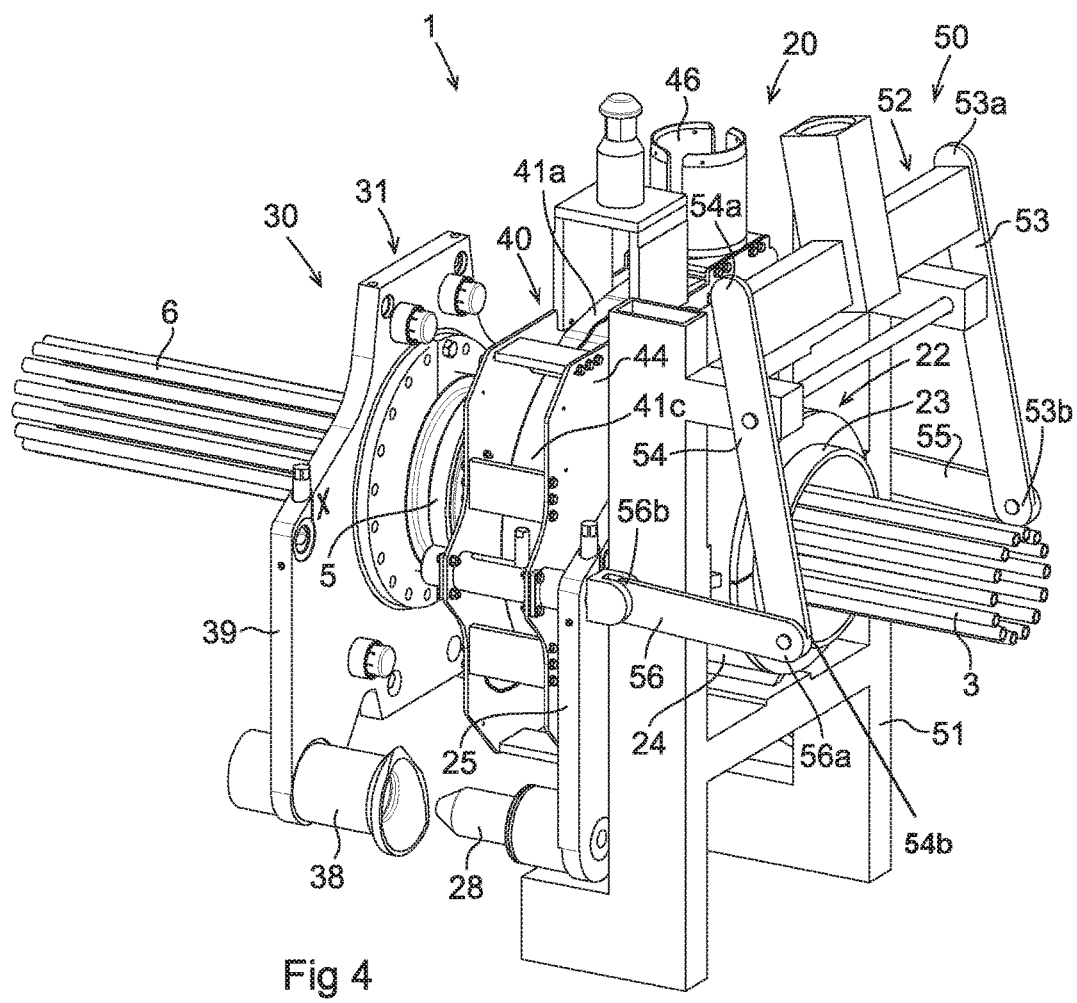
FIG. 4 is a perspective view from another side of the first and second connection appliances of FIG. 3, FIGS. 5A, 5B and 5C are lateral views of the first and second connection appliances of FIG. 3, as seen at different stages during the connection of two hubs to each other.
Figure 5A:
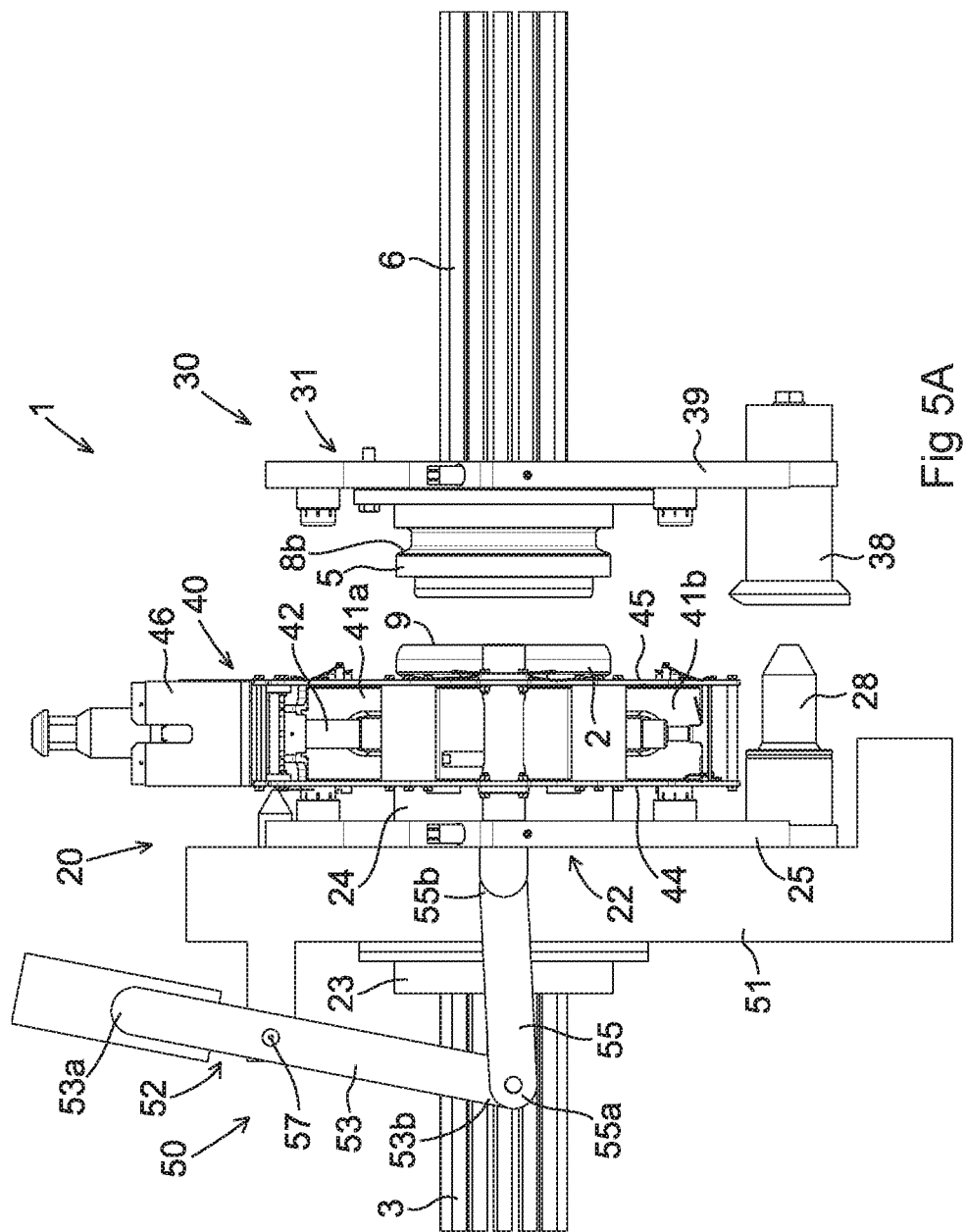

A horizontal connection arrangement 1 according to an embodiment of the present invention is illustrated in FIGS. 1-6. The horizontal connection arrangement 1 comprises a first connection appliance 20, a second connection appliance 30 and a connector 40.

The horizontal connection arrangement 1 is to be used for connecting a first single or multibore hub 2 arranged at an end of one or more fluid conduits 3 (see e.g. FIG. 6A) of a first subsea module 4 (see FIG. 1) included in a subsea oil and/or gas production system, or in a subsea water and/or gas injection system, to a corresponding second hub 5 arranged at an end of one or more fluid conduits 6 of a second subsea module 7 (see FIG. 2) included in said system. The fluid conduits 3, 6 are for instance hydraulic lines and/or gas lines. The first hub 2 is fixed to a first holding unit 21 (see e.g. FIG. 6A) included in the first connection appliance 20, whereas the second hub 5 is fixed to a second holding unit 31 included in the second connection appliance 30.

Each one of the first and second subsea modules 4, 7 is mountable to a landing platform or interface of a seabed-based foundation structure (not shown) of the subsea system by being lowered vertically downwards into engagement with the landing platform/interface so as to come to bear against it, and demountable from the foundation structure by being lifted vertically upwards away from the landing platform/interface.

The connector 40 is used for connecting and securing the first hub 2 to the second hub 5. In the illustrated embodiment the connector 40 is a clamp connector, but it may as an alternative be a collet connector of conventional type with clamping elements in the form of collet fingers. The illustrated clamp connector 40 comprises arc-shaped clamping elements 41a, 41b, 41c which are configured to clamp together the first hub 2 with the second hub 5 in order to form a fluid-tight connection between the fluid conduits 3 of the first subsea module 4 and the corresponding fluid conduits 6 of the second subsea module 7. The clamping elements 41a, 41b, 41c may be designed and operated in a conventional manner well known to a person skilled in the art. A space for receiving the ends of the two hubs 2, 5 to be connected to each other is provided between the clamping elements 41a, 41b, 41c. Two clamping elements 41a, 41b have a hinged first end and an opposite second end. An operating shaft 42 is connected to the last-mentioned clamping elements 41a, 41b, and the operating shaft 42 (see e.g. FIG. 5A) is moveable by means of a remotely operated actuating tool (not shown) in order to move said second ends of the clamping elements 41a, 41b towards each other and thereby pivot the clamping elements into engagement with the hubs 2, 5. The actuating tool may be detachably mounted to a torque bucket 46 on the clamp connector 40 by means of an ROV (ROV=Remotely Operated Vehicle) or diver.

The operating shaft 42 is for instance an externally threaded shaft which is in threaded engagement with an internally threaded first trunnion member (not shown) pivotally mounted to the first clamping element 41a at said second end thereof and with an internally threaded second trunnion member (not shown) pivotally mounted to the second clamping element 41b at said second end thereof. In this case, the actuating tool is a torque tool configured to rotate the operating shaft 42 about its longitudinal axis in a first direction in order to pivot the clamping elements 41a, 41b towards the hubs 2, 5 and in the opposite direction in order to pivot the clamping elements 41a, 41b away from the hubs 2, 5.

Each clamping element 41a, 41b, 41c has opposed bevelled wedging surfaces 43a, 43b (see FIGS. 6a-6c) for engaging corresponding bevelled wedging surfaces 8a, 8b provided on the hubs 2, 5 to be connected to each other. The clamping elements 41a, 41b are moveable to and fro between an open position and a closed position under the effect of the operating shaft 42. In the closed position (not shown), the clamping elements 41a, 41b are pivoted towards each other and the wedging surfaces 43a, 43b of the clamping elements 41a, 41b are in engagement with the corresponding wedging surfaces 8a, 8b of the hubs 2, 5 and thereby keep the hubs tightly clamped to each other. In the open position (see FIG. 6c), the clamping elements 41a, 41b are pivoted away from each other and do not exert any clamping action on the hubs 2, 5.

The first connection appliance 20 comprises a sliding unit 22 which is slidably mounted to the first holding unit 21 so as to be horizontally moveable in relation to the first holding unit 21 and the first hub 2 in the axial direction of the first hub. The connector 40 has a rear side 44 facing the sliding unit 22 and an opposite front side 45 facing away from the sliding unit 22. The connector 40 is mounted to the sliding unit 22 so as to be moveable together with the sliding unit 22 in relation to the first holding unit 21 and the first hub 2 between a retracted position (see FIGS. 1, 3, 4, 5A and 6A), in which an outer end 9 of the first hub 2 projects beyond the front side 45 of the connector 40, and an advanced position (see FIGS. 5b, 5c, 6b and 6c), in which the outer end 9 of the first hub 2 is received inside the connector 40 in the space between the clamping elements 41a, 41b, 41c. The sliding unit 22 and the connector 40 are moveable between the retracted position and the advanced position by means of an actuating device 50 included in the first connection appliance 20.

In the illustrated embodiment, the first holding unit 21 comprises a tubular casing 23, wherein the first hub 2 is fixed at the front end of this tubular casing 23. The sliding unit 22 is slidably mounted to the tubular casing 23 so as to be slidable in the axial direction thereof between the retracted position and the advanced position. The sliding unit 22 comprises a sleeve-shaped member 24 and a vertical holding plate 25 rigidly mounted to the sleeve-shaped member 24 at the front end thereof, wherein the tubular casing 23 extends through the sleeve-shaped member 24 and through an opening in the holding plate 25. The connector 40 is mounted to the holding plate 25.

The first holding unit 21 is slidably mounted to a base frame 10 (see FIG. 1) of the first subsea module 4 so as to allow the first holding unit 21 to be moved in relation to this base frame 10 in a horizontal direction from a retracted first position (see FIGS. 3, 4, 5A, 5B, 6A and 6B) to an advanced second position (see FIGS. 5C and 6C) and thereby bring the first hub 2 into contact with the second hub 5. The first holding unit 21 is provided with a stop member 26 (see FIGS. 6A-6C), wherein a first shoulder 27*a* on the sliding unit 22 is configured to be in contact with the stop member 26 when the sliding unit 22 is in the retracted position. A second shoulder 27*b* on the sliding unit 22 is configured to come into contact with the stop member 26 when the sliding unit 22 has been moved by the above-mentioned actuating device 50 to the advanced position to thereby prevent a further movement of the sliding unit 22 forwards in relation to the first holding unit 21. The actuating device 50 is configured to move the first holding unit 21 from the first position to the second position by acting on the first holding unit 21 via the sliding unit 22, the second shoulder 27*b* on the sliding unit and the stop member 26 on the first holding unit. In the illustrated example, the stop member 26 is formed by a projection, for instance in the form of a flange, provided on the envelop surface of the tubular casing 23, whereas the first shoulder 27*a* is formed by an annular surface on the holding plate 25 and the second shoulder 27*b* is formed by an annular surface on a rear wall 29 of the sleeve-shaped member 24.

In the illustrated embodiment, the actuating device 50 has the form of a link mechanism and comprises: a support structure 51, which is rigidly mounted to the base frame 10 of the first subsea module 4; an actuating lever 52 which is pivotally mounted to the support structure 51, the actuating lever 52 comprising a first arm 53 and a second arm 54 which are mutually parallel and arranged on opposite sides of the support structure 51, each arm 53, 54 having an upper end 53*a*, 54*a* and an opposite lower end 53*b*, 54*b*; a first connecting link 55 (see FIG. 3), which has a first end 55*a* and an opposite second end 55*b*, wherein this first connecting link 55 at its first end 55*a* is articulately connected to the lower end 53*b* of said first arm 53, and at its second end 55*b* is articulately connected to the sliding unit 22; and a second connecting link 56 (see FIG. 4) which extends in parallel with the first connecting link 55 and has a first end 56*a* and an opposite second end 56*b*, wherein this second connecting link 56 at its first end 56*a* is articulately connected to the lower end 54*b* of said second arm 54, and at its second end 56*b* is articulately connected to the sliding unit 22.

The actuating lever 52 is pivotally mounted to the support structure 51 via the first and second arms 53, 54 so as to be pivotable in relation to the support structure 51 about a horizontal pivot axis 57 extending perpendicularly to the first and second arms 53, 54 at a position between the upper and lower ends thereof.

The actuating lever 52 of the actuating device 50 is pivotable about the above-mentioned pivot axis 57 (see FIGS. 5A-5C) by means of a power member (not shown): in a first step from a starting position (see FIGS. 3, 4, 5A and 6A), in which the first holding unit 21 is in the above-mentioned first position and the sliding unit 22 and the connector 40 are in the retracted position in relation to the first holding unit 21, to an intermediate position (see FIGS. 5B and 6B), in which the first holding unit 21 is maintained in the first position and the sliding unit 22 and the connector 40 have been moved forwards to the advanced position in relation to the first holding unit 21; and in a second step from said intermediate position (see FIGS. 5B and 6B) to a final position (see FIGS. 5C and 6C), in which the first holding unit 21 has been moved forwards together with the sliding unit 22 and the connector 40 to the above-mentioned second position and the sliding unit 22 and the connector 40 are maintained in the advanced position in relation to the first holding unit 21.

The actuating lever 52 may be pivoted in the opposite direction when the first hub 2 is to be released from the second hub 5.

In the embodiment illustrated in FIGS. 1-6, the second holding unit 31 is rigidly mounted to a base frame 11 (see FIG. 2) of the second subsea module 7 and comprises a vertical holding plate 39, to which the second hub 5 is rigidly fixed. Furthermore, in this embodiment, the sliding unit 22 and the second holding unit 31 are provided with corresponding alignment members 28, 38, which are configured to come into contact with each other in order to align the first hub 2 with the second hub 5 when the first and second hubs 2, 5 are moved horizontally into contact with each other, i.e. when the first holding unit 21 is moved forwards together with the sliding unit 22 and the first hub 2 from the above-mentioned first position to the above-mentioned second position. One of the sliding unit 22 and the second holding unit 31 is provided with at least two horizontally extending male-like alignment members 28, in the form of spears, which are designed to fit into corresponding female-like alignment members 38, in the form of spear funnels, arranged on the other one of the sliding unit 22 and the second holding unit 31. In the illustrated example, the sliding unit 22 is provided with two alignment spears 28 which are fixed to the holding plate 25, whereas the second holding unit 31 is provided with two spear funnels 38 for receiving a respective one of the alignment spears 28. The spear funnels 38 are mounted to the holding plate 39.

As an alternative to the embodiment described above, the first connection appliance 20 and the second connection appliance 30 may both have the same or essentially the same design as the first connection appliance 20 described above with reference to FIGS. 1-6. Thus, in this case the second connection appliance 30 comprises a sliding unit which is slidably mounted to the second holding unit so as to be horizontally moveable in relation to the second holding unit and the second hub 5 in the axial direction of the second hub, wherein the connector 40 could be mounted to the sliding unit 22 of the first connection appliance 20 so as to be moveable together with this sliding unit 22 between the above-mentioned retracted and advanced positions or mounted to the sliding unit of the second connection appliance 30 so as to be moveable together with this sliding unit in relation to the second holding unit and the second hub 5 between a retracted position, in which an outer end of the second hub projects beyond a front side of the connector, and an advanced position, in which the outer end of the second hub is received inside the connector.

The invention is of course not in any way restricted to the embodiments described above. On the contrary, many possibilities to modifications thereof will be apparent to a person with ordinary skill in the art without departing from the basic idea of the invention such as defined in the appended claims.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A horizontal connection arrangement for subsea connection of a first single bore or multibore hub arranged on a first subsea module of a subsea oil and/or gas production system or subsea water and/or gas injection system to a second single bore or multibore hub arranged on a second subsea module of the system, the horizontal connection arrangement comprising:
   a first connection appliance mounted to the first subsea module, wherein the first hub is fixed to a first holding unit included in the first connection appliance;
   a second connection appliance mounted to the second subsea module, wherein the second hub is fixed to a second holding unit included in the second connection appliance; and
   a connector configured to connect and secure the first hub to the second hub, wherein
   the first connection appliance comprises a sliding unit which is slidably mounted to the first holding unit so as to be horizontally moveable in relation to the first holding unit and the first hub in the axial direction of the first hub;
   the connector is mounted to the sliding unit so as to be horizontally moveable together with the sliding unit in relation to the first holding unit and the first hub between a retracted position, in which an outer end of the first hub projects beyond a front side of the connector, and an advanced position, in which the outer end of the first hub is received inside the connector;
   the first holding unit comprises a tubular casing, wherein the first hub is fixed at an end of this tubular casing; and
   the sliding unit is slidably mounted to the tubular casing so as to be slidable in the axial direction thereof.

2. The horizontal connection arrangement according to claim 1, wherein the first connection appliance comprises an actuating device configured to move the sliding unit and the connector between the retracted position and the advanced position.

3. The horizontal connection arrangement according to claim 1, wherein:
   the sliding unit comprises a sleeve-shaped member and a vertical holding plate rigidly mounted to the sleeve-shaped member at the front end thereof, wherein the tubular casing extends through the sleeve-shaped member and through an opening in the holding plate; and
   the connector is mounted to the holding plate.

4. The horizontal connection arrangement according to claim 1, wherein the connector is a clamp connector.

5. A horizontal connection arrangement for subsea connection of a first single bore or multibore hub arranged on a first subsea module of a subsea oil and/or gas production system or subsea water and/or gas injection system to a second single bore or multibore hub arranged on a second subsea module of the system, the horizontal connection arrangement comprising:
   a first connection appliance mounted to the first subsea module, wherein the first hub is fixed to a first holding unit included in the first connection appliance;
   a second connection appliance mounted to the second subsea module, wherein the second hub is fixed to a second holding unit included in the second connection appliance; and
   a connector configured to connect and secure the first hub to the second hub, wherein
   the first connection appliance comprises a sliding unit which is slidably mounted to the first holding unit so as to be horizontally moveable in relation to the first holding unit and the first hub in the axial direction of the first hub;
   the connector is mounted to the sliding unit so as to be horizontally moveable together with the sliding unit in relation to the first holding unit and the first hub between a retracted position, in which an outer end of the first hub projects beyond a front side of the connector, and an advanced position, in which the outer end of the first hub is received inside the connector; and
   the first holding unit is slidably mounted to a base frame of the first subsea module to allow the first holding unit to be moved in relation to this base frame in a horizontal direction from a retracted first position to an advanced second position and thereby bring the first hub into contact with the second hub.

6. The horizontal connection arrangement according to claim 5, wherein:
   the first holding unit comprises a stop member, wherein a shoulder on the sliding unit is configured to come into contact with this stop member when the sliding unit has been moved by the actuating device to the advanced position to thereby prevent a further movement of the sliding unit forwards in relation to the first holding unit; and
   the actuating device is configured to move the first holding unit from said first position to said second position by acting on the first holding unit via the sliding unit, the shoulder on the sliding unit and the stop member on the first holding unit.

7. The horizontal connection arrangement according to claim 5, wherein the connector is a clamp connector.

8. A horizontal connection arrangement for subsea connection of a first single bore or multibore hub arranged on a first subsea module of a subsea oil and/or gas production system or subsea water and/or gas injection system to a second single bore or multibore hub arranged on a second subsea module of the system, the horizontal connection arrangement comprising:
   a first connection appliance mounted to the first subsea module, wherein the first hub is fixed to a first holding unit included in the first connection appliance;
   a second connection appliance mounted to the second subsea module, wherein the second hub is fixed to a second holding unit included in the second connection appliance; and
   a connector configured to connect and secure the first hub to the second hub, wherein
   the first connection appliance comprises a sliding unit which is slidably mounted to the first holding unit so as to be horizontally moveable in relation to the first holding unit and the first hub in the axial direction of the first hub;
   the connector is mounted to the sliding unit so as to be horizontally moveable together with the sliding unit in relation to the first holding unit and the first hub between a retracted position, in which an outer end of the first hub projects beyond a front side of the connector, and an advanced position, in which the outer end of the first hub is received inside the connector; and
   the sliding unit and the second holding unit comprises corresponding alignment members, which are configured to come into contact with each other in order to align the first hub with the second hub when the first and second hubs are moved horizontally into contact with each other.

9. The horizontal connection arrangement according to claim 8, wherein one of the sliding unit and the second holding unit comprises at least two horizontally extending male-like alignment members, configured to fit into corresponding female-like alignment members, arranged on the other one of the sliding unit and the second holding unit.

10. The horizontal connection arrangement according to claim 8, wherein the connector is a clamp connector.

* * * * *